73-632 SR
9/8/81 OR 4,287,770

United States Patent [19] | [11] 4,287,770
Weyns | [45] Sep. 8, 1981

[54] METHOD FOR THE MANUFACTURE OF ULTRASONIC TRANSDUCERS

[75] Inventor: Arthur Weyns, Muizen, Belgium

[73] Assignee: Siemens Aktiengesellschaft, Berlin & Munich, Fed. Rep. of Germany

[21] Appl. No.: 105,643

[22] Filed: Dec. 20, 1979

[30] Foreign Application Priority Data

Dec. 20, 1978 [DE] Fed. Rep. of Germany ....... 2855143

[51] Int. Cl.³ .............................................. G01N 29/00

[52] U.S. Cl. ..................................... 73/632; 29/25.35; 310/334

[58] Field of Search ......................... 73/632, 626, 642; 29/594, 25.35; 310/322, 330, 334, 336; 128/660

[56] References Cited

U.S. PATENT DOCUMENTS 3,666,979 5/1972 McElroy .............................. 73/642
3,936,791 2/1976 Kossoff ................................ 73/626

OTHER PUBLICATIONS

G. Kossoff et al., "Ultrasonic Two-Dimensional Visualization for Medical Diagnosis," *J. Acous. Soc. Am.*, vol. 44, No. 5, pp. 1310-1318, 1968.
C. B. Burckhardt et al., "A Real-Time B-Scanner with Improved Lateral Resolution," pp. 81-87 and 89, 1975.

*Primary Examiner*—Stephen A. Kreitman
*Attorney, Agent, or Firm*—Hill, Van Santen, Steadman, Chiara & Simpson

[57] ABSTRACT

In a focusing ultrasonic transducer with a recessed active surface, it is desirable that, given values of the focal width and of the focal distance prescribable as desired, an optimum lateral resolution with the smallest possible influence of side lobes ensues. This is achieved by means of manufacture in the following steps:

(a) first, for focal width ($F_B$) or focal interval ($F_A$), the outer dimension ($2a_O$) is determined as a function of the radius of curvature (R) of the transducer or the radius of curvature (R) is determined as a function of the outer dimension ($2a_O$);

(b) then the magnitude of outer dimension or, respectively, radius of curvature not yet determined is determined for the other of the two focal magnitudes (for example, $F_A$); and (c) the maximum value of the angle of aperture of the sound radiation field behind the focus deriving in that manner is limited by means of a suitable selection of the size ($2a_i$) of the recess in the active surface of the transducer such that the relationship between the angle of aperture and side lobes becomes optimum.

18 Claims, 10 Drawing Figures

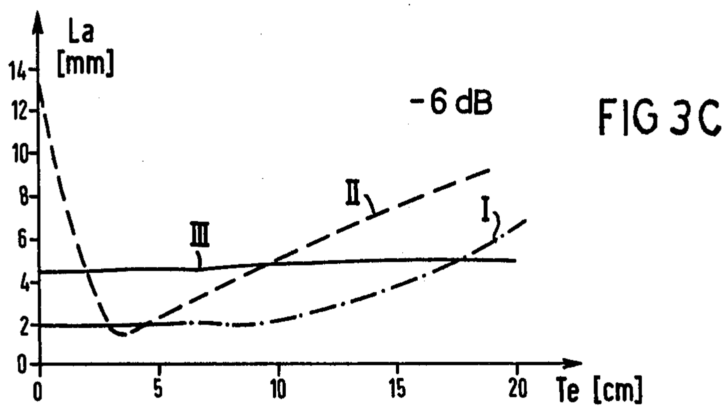
FIG 3C
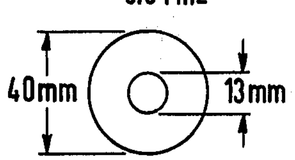
FIG 3A
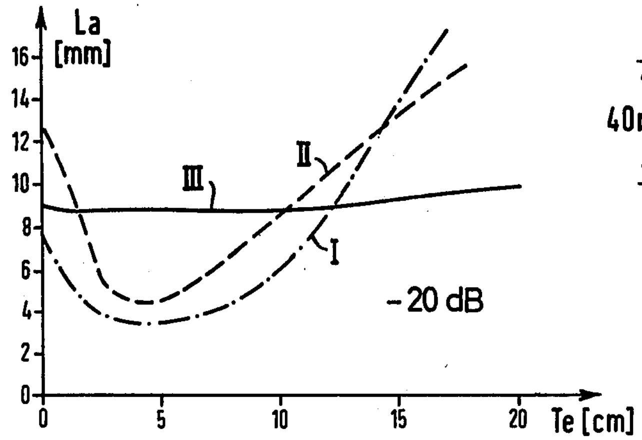
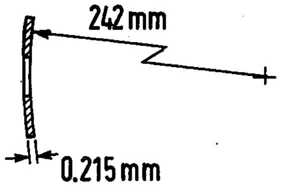
FIG 3D
FIG 3B
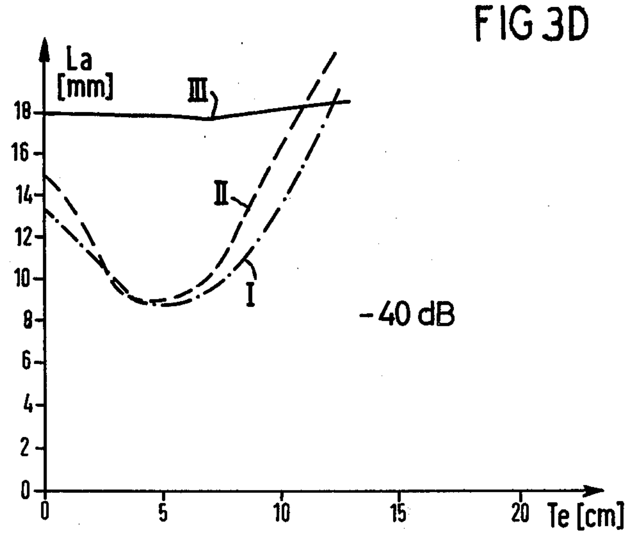
FIG 3E

METHOD FOR THE MANUFACTURE OF ULTRASONIC TRANSDUCERS

BACKGROUND OF THE INVENTION

The invention relates to a method for the manufacture of ultrasonic transducers, with at least one ultrasonic transducer configuration whose active surface exhibits recesses and whose sound radiation field is to be prescribable in terms of focal distance, focal width and angle of aperture in connection with the focus and ultrasonic frequency.

In ultrasonic technology, particularly in the electromedical field or in the field of material testing, there is a desire for optimum adaptation of the sound radiation field of the respective ultrasonic transducer to the conditions. Thus, the focal distance, for example, should always be optimally adjustable to the respective distance of the examination point from the transducer surface. The focal width and the angle of aperture of the sound radiation field should likewise be as small as possible so that the lateral resolution becomes optimum. The influence of side lobes of the sound radiation field should be as low as possible. Finally, all of these conditions should be given for any desired use purpose, thus, for example, for ultrasonic devices with or without a preliminary water segment or some other format. Known methods for the manufacture of ultrasonic transducers do not allow up to now of a clear, optimum matching between focal interval, focal width and angle of aperture of the sound radiation field, as this is actually desired. Thus, the periodical "Journal of Acoustical Society of America", Vol. 44, No. 5, 1968 describes such a manufacturing method on pages 1310 through 1318, particularly, however, on page 1312, in which the individual values cannot be prescribed and varied separately from one another. The ultrasonic transducers manufactured according to the method, moreover, are only laid out for continuous sound not, however, also for pulse-echo operation. Upon employment in pulse-echo operation, there automatically and inevitably ensue greater values for the focal distance and focal width and also the angle of aperture, which is actually undesired. In ultrasonic transducers, the lateral resolution can be improved by setting the focus and angle of aperture of the sound radiation field behind the focus to be as small as possible. In ultrasonic transducers with or without a preliminary water segment, as is known, a smaller angle of aperture can be achieved by means of enlarging the active transducer surface or by means of prescribing a weaker radius of curvature of the artificial focusing (mechanical or electronic) of the transducer. An increased active transducer surface or a weaker radius of curvature, however, always lead to an expansion of the sound radiation field at the focus and behind it. The result is a deterioration of the lateral resolution both at the focus as well as in the examination area of the sound field lying behind it. If one eliminates these measures, i.e., thus, the transducer surface is reduced or is more strongly, artificially focused, then the lateral resolution directly at the focus is improved. However, directly behind the focus the lateral resolution deteriorates quickly since the angle of aperture is now significantly greater than before. This is also true in this sense for the proposals for the manufacture of strongly focused transducers made in the essay "A real-time B-scanner with improved lateral resolution" by C. B. Burckhardt et al. Thus, for example, the spherically curved transducer illustrated in FIG. 1 on page 81 is geometrically strongly focused so that for different dB lobes focuses lying close to one another and, thus, good lateral resolution in this region, ensue. Behind this focal range, however, there appears a very large angle of aperture which immediately and quickly again deteriorates the lateral resolution. Thus, the area of good lateral resolution is limited in an undesirable manner to an examination area which is much too small. The ultrasonic transducer illustrated in FIG. 2 on page 82 of the essay is constructed annularly, whereby, according to FIG. 4 on page 84, the ring consists of individual partial elements which follow one another. The annular form of the transducer favors the formation of interference structures. By so doing, relatively strong focusing and a small angle of aperture and, thus, good lateral resolution, too, ensue. However, the increased presence of interference structures is accompanied by an increase of the influence of side lobes. These side lobes lead to image falsifications.

SUMMARY OF THE INVENTION

The object of the present invention is to design ultrasonic transducers such that, given any desired prescribable values of the focal width and of the focal distance, optimum lateral resolution ensues with the smallest possible influence of side lobes.

The object is achieved with a method which is inventively characterized by the following steps:

(a) for the two prescribable focal magnitudes of focal width and focal distance, there is first set for one of the two focal magnitudes either the external dimension of the transducer active surface as a function of the radius of curvature of the ultrasonic transducer or its radius of curvature as a function of the outer dimension;

(b) given the outer dimension set in that manner or the radius of curvature set in that manner, the magnitude radius of curvature or, respectively, outer dimension not yet determined is set for the other of the two prescribable focal magnitudes;

(c) the maximum value of the angle of aperture of the sound radiation field behind the focus ensuing for the other dimension and radius of curvature according to steps (a) and (b), finally, is limited by means of the incorporation of a recess in the active surface of the ultrasonic transducer of such size that the optimum relationship between angle of aperture and side lobes of the sound radiation field ensues.

An ultrasonic transducer manufactured according to the method according to the invention is then inventively characterized in that a transducer part determined according to steps (a) and (b) as to outer dimension and radius of curvature of the focusing is recessed by means of the mechanical removal (for example, a through-hole or a recess of the contact layer on the surface side) of a part of the transducer material, or a transducer at least electrically subdivided into individual radiation surfaces is "recessed" by means of electrically switching off individual surface parts in the active surface.

Further advantages and details of the invention derive from the following description of an exemplary embodiment on the basis of the accompanying sheets of drawings in conjunction with the subclaims; and other objects, features and advantages will be apparent from this detailed disclosure and from the appended claims.

BRIEF DESCRIPTION OF THE DRAWINGS

FIG. 1 comprising

FIG. 2 comprising

FIG. 3 comprises FIGS. 3A and 3B showing a practical exemplary embodiment for a ring transducer manufactured according to the invention and further comprises FIGS. 3C–3E which are diagrams for illustrating the lateral resolution as a function of the penetration depth achieved with this ring transducer in comparison with ultrasonic transducers manufactured according to traditional methods.

DETAILED DESCRIPTION

Figure 1A:
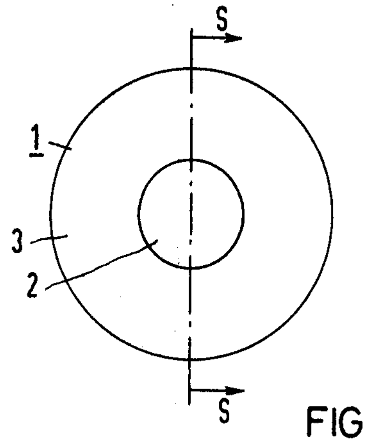
FIGS. 1A and 1B show a compact ring transducer with mechanical focusing, manufactured according to the method according to the invention.
Figure 1B:
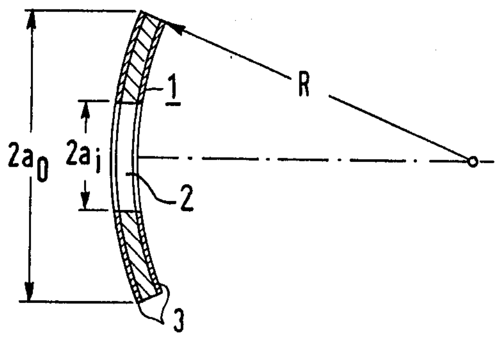

FIG. 1 shows a ring transducer 1 consisting, for example, of piezoceramic material. In the present case, the ring transducer 1 exhibits a through-hole 2 as a mechanical recess. A recess in a contact layer 3 only can just as well be present instead of a through-hole. The ring transducer 1 provided with the recess 2 is mechanically bent with the radius of curvature R. Of course, instead of this mechanical curvature, a planar transducer with electronic curvature or a combined form consisting of both can be selected. In the two latter cases, the compact transducer form part must be subdivided into individual segments 4 for generating the delay times required for the electronic curvature (electronic focusing). This state of affairs, for example, is indicated in FIG. 2

Figure 2A:
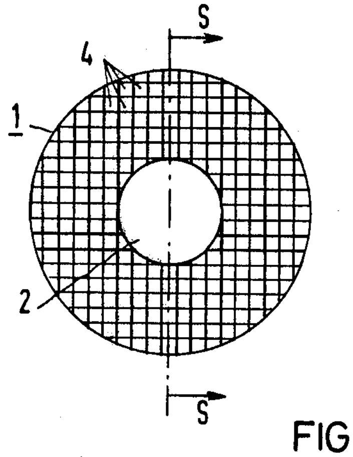
FIGS. 2A and 2B shows a ring transducer in matrix form for electronic focusing, manufactured according to the method according to the invention.
Figure 2B:
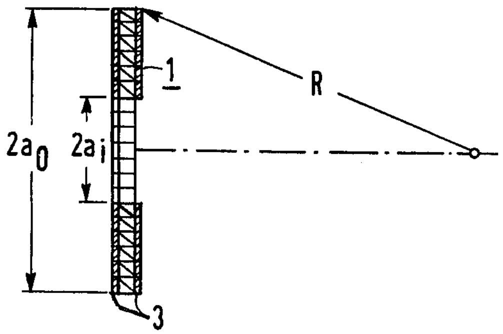

An oscillator of FIG. 1 or, respectively, FIG. 2, is manufactured in accord with the invention as follows:

First, for the use case respectively desired, the focal width $F_B$ and the focal interval $F_A$ are prescribed at their optimum values. The focal width $F_B$, however, like the focal interval $F_A$, is a function of the radius of curvature R of the focusing and of the outer dimension $2a_O$ of the transducer. Therewith, there ensues the equation for the focal width (with reference to a specific number of oscillations within the excitation and/or echo pulse):

$$F_B = f(R, a_O) \quad (1)$$

The same is also true for the focal distance $F_A$ with the equation $$F_A = g(R, a_O) \quad (2)$$

By means of conversion to $a_O$, there follows from (1)

$$a_O = F_1(R, F_B) \quad (3)$$

or $$R = F_2(a_O, F_B) \quad (4)$$

There then ensues from (2) in conjunction with (3)

$$R = G_1(F_A, F_1(R, F_B)) \quad (5)$$

or from (2) in conjunction with (4)

$$a_O = G_2(F_A, F_2(a_O, F_B)) \quad (6)$$

For reasons of simplification, the determination of (3) first as a function of a standardized radius $R_N$ is to be recommended, said standardized radius being defined as follows:

$$R_N = R/(a_o^2/\lambda) \quad (7)$$

In this case, given complete frequency independence, the relative focal width $F_B/a_o$ and the standardized focal distance $$F_A/(a_o^2/\lambda) \quad (8)$$

are automatically determined from $R_N$. See the second figure at page 220 of my article entitled "Radiation field calculations of pulsed ultrasonic transducers Part 2: spherical disc- and ring-shaped transducers", published in *Ultrasonics,* September 1980, pages 219 through 223. Thus, the correct dimension for the outer dimension $2a_o$ is also automatically fixed as a function of $R_N$. Then, however, the required value $R_N$ can be determined from the comparison of the prescribed focal distance $F_A$ to the focal distance $F_A$ obtained as a function of $R_N$ given a prescribed operating frequency. Therewith, however, the outer dimension $2a_o$ is also determined, so that the actual radius of curvature R can now be obtained from the magnitudes $R_N$ and $2a_o$. The maximum value of the angle of aperture of the sound radiation field behind the focus deriving with the fixed values for the outer dimension and radius of curvature can now be limited in a simple manner by means of adjusting the size $2a_i$ of the recess in the active surface of the ultrasonic transducer in such manner that an optimum relationship between the angle of aperture and side lobes of the sound radiation field which corresponds to the conception of the device ensues. A more direct method is also possible, using the relations:

$$F_B/a_o = h(R_N, a_i/a_o) \quad (9)$$

$$F_A/a_o^2/\lambda = i(R_N, a_i/a_o) \quad (10)$$

(see the ninth and tenth figures at page 222 of the above referenced paper). For a given $F_B$ and $F_A$, a set of ($R_N$, $a_i/a_o$, frequency)—values belonging together is found. Assuming again a given number of cycles within the pulse, the best ($R_N$, $a_i/a_o$, frequency—combination can be obtained using the relation:

$$a_i/a_o = m(\theta) \quad (11)$$

(see the following Table A) and the conditions: a given frequency range, $\theta$ as well as the side lobes as small as possible (in formation about the side lobes follows from the measured or numerically calculated field patterns of the spherical annular transducers.

TABLE A

| $a_o/a_i$ A | ∞ | 5 | 4 | 3 | 2 |
|---|---|---|---|---|---|
| 0.32 | 39 | 39 | 34 | 33.5 | 23 |
| 0.40 | 26 | 26 | 25 | 23.5 | 21 |

TABLE A-continued

| A | $a_o/a_i$ ∞ | 5 | 4 | 3 | 2 |
|---|---|---|---|---|---|
| 0.53 | 25 | 24 | 23.5 | 23 | 21 |

FIGS. 3A and 3B show a practical exemplary embodiment for a ring transducer according to FIG. 1 which, for example, for the operating frequency of f=3.5 MHz, exhibits an outer diameter $2a_o=40$ mm and an inner recess with a diameter of $2a_i=13$ mm. The radius of curvature is set at R=242 mm. The diagrams of FIGS. 3C, 3D and 3F show the plots of the lateral resolution La (mm) as a function of penetration depth Te (cm) of the ultrasonic energy in the examination area resulting with this transducer according to the invention for the −6dB lobe, the −20db lobe and the −40dB lobe of the sound radiation field, respectively. It can be clearly seen that the plot of lateral resolution for the embodiment of FIGS. 3A and 3B as indicated at I in FIGS. 3C–3E has a significantly better characteristic in the interesting penetration depth range from approximately 0 through 13 cm than the characteristics indicated at II and III in FIGS. 3C–3E showing the lateral resolution as a function of penetration depth of such ultrasonic transducers as were manufactured according to traditional methods.

Figure 4:
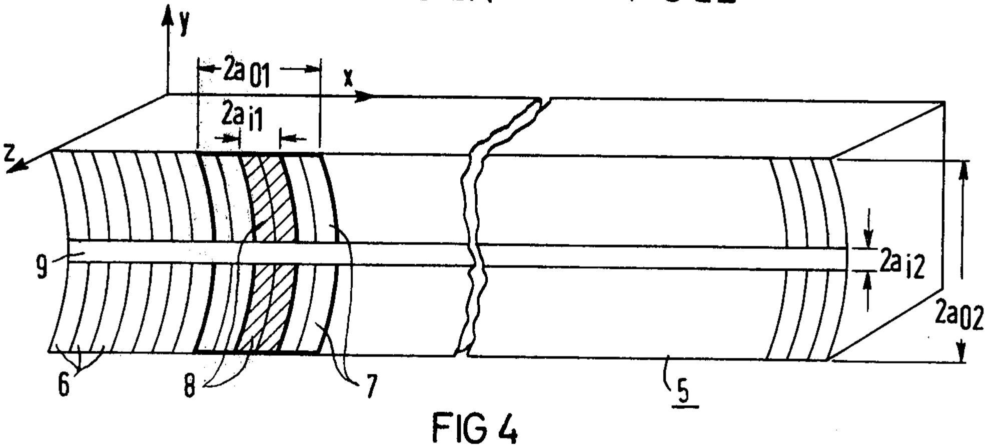
FIG. 4 shows an ultrasonic transducer in the form of an ultrasonic array with a combined form consisting of mechanical and electrical recessing.

FIG. 4 shows an alternative example to FIGS. 1 and 2. According to this alternative example, the ultrasonic transducer can be constructed in the form of an array 5 comprising a multitude of individual elements 6 (for example, between sixty and one hundred sixty elements) arranged next to one another. In such ultrasonic transducers in array form, the line-wise continuation of the ultrasonic beam for the construction of an ultrasonic image occurs by means of stepping the activation of the individual elements 6 in groups. In the array of FIG. 4, for example, such groups are referenced with 7. The determination of the inactive surface can ensue electronically or mechanically. In the exemplary embodiment of FIG. 4, there is a combined form. Thus, for example, each group 7 to be stepped is provided with an inner recess 8 by means of electrical disconnection of individual elements within the group. This recess 8 respectively extends at right angles to the longitudinal direction of the array. A further recess 9 which is not electronically but, rather, mechanically laid out in the present case, extends in the longitudinal direction of the array. The dimensions $2a_{01}$, $2a_{i1}$ and $2a_{02}$, $2a_{i2}$ of recesses 8 and 9 are determined according to step (c) of the inventive method. In the exemplary embodiment of FIG. 4, the group 7 of individual elements, in conjunction with the electric recess 8, determines the radius of curvature of the focusing according to the invention in the z, x plane of the indicated system of coordinates. The focusing in the z, y plane is predetermined according to the invention by means of the indicated mechanical curvature of the array individual elements in conjunction with the mechanical recess 9. Of course, an electronic focusing can be undertaken instead of the mechanical curvature for the purpose of focusing. In this case, the array need only be constructed matrix-like in its individual elements in accord with the exemplary embodiment of FIG. 2.

It will be apparent that many modifications and variations may be effected without departing from the scope of the novel concepts and teachings of the present invention.

The technical paper on the following pages of the specification, headed Appendix A has been accepted for publication in the Journal "Ultrasonics" and as submitted for publication is hereby incorporated herein by reference in its entirety.

Particular attention is called to the following sections and Figures of the paper which are found in the attached Appendix A (the page numbers in parenthesis referring to the numbering of pages of the paper itself as found at the top of such pages):

| Section | Section Heading |
|---|---|
| I | Introduction (page one) |
| IV | Annular Transducer (page nine-page twelve) |
| V | Spherical Transducer (page twelve-page sixteen) |
| VI | Spherical Annular Transducer (page sixteen-page eighteen) |
| VII | Conclusion (page eighteen) |
| Figure Designation | Figure Description |
| Twelve | Ultrasonic pressure pattern for plane annular transducer, $a_i = a_o/2$; $a_o$ = 7.5 mm, frequency 2 MHz, $n_c$ = 2 - modulated Gaussian pulse, (page nine) |
| Fourteen | Influence of inner radius, $a_i$, on normalized −3 dB focal distance, $d_f$, and on relative −3 dB focal width, $w_f$, for plane annular transducer; $a_o$ = 7.5 mm, frequency 2 MHz, $n_c$ = 2 - modulated Gaussian pulse. (page ten) |
| Sixteen | Influence of normalized radius of curvature, A, on relative −3 dB focal width, $w_f$, for spherical disk shaped radiator; radius a = 7.5 mm, frequency 2 MHz, $n_c$ = 2 - modulated Gaussian pulse - Kossoff's approach. (page twelve) |
| Seventeen | Influence of normalized radius of curvature, A, on normalized −3 dB focal distance, $d_f$, for spherical disk-shaped radiator; radius a = 7.5 mm, frequency 2 MHz, $n_c$ = 2 - modulated Gaussian pulse - Kossoff's approach. (page twelve) |
| Eighteen | Influence of normalized radius of curvature, A, on −3 dB and −10 dB angle of aperture, θ, for spherical disk-shaped radiator; radius a = 7.5 mm, frequency 2 MHz, $n_c$ = 2 - modulated Gaussian pulse - Kossoff's approach. (page fourteen) |
| Twenty-one | Ultrasonic pressure pattern for spherical disk-shaped transducer, A = 0.32; radius a = 7.5 mm, frequency 2 MHz, $n_c$ = 2 - modulated Gaussian pulse. (page fourteen) |
| Twenty-four | Influence of normalized radius of curvature, A, on normalized −3 dB focal distance, $d_f$, and relative −3dB focal width, $w_f$, for spherical annular transducer, $a_i = a_o/2$; $a_o$ = 7.5 mm, frequency 2 MHz, $n_c$ = 2 - modulated Gaussian pulse. (page sixteen) |
| Twenty-five | Influence of inner radius, $a_i$, on relative −3 dB focal width, $w_f$, for spherical annular transducer; $a_o$ = 7.5 mm, frequency 2 MHz, $n_c$ = 2 - modulated Gaussian pulse. (page sixteen) |
| Twenty-six | Influence of inner radius, $a_i$, on normalized −3 dB focal distance, $d_f$, for spherical annular transducer; $a_o$ = 7.5 mm, frequency 2 |

-continued

| | |
|---|---|
| | MHz, $n_c = 2$ - modulated Gaussian pulse. (page sixteen) |
| Twenty-seven | Influence of transducer shape; $-3$ dB pressure contour for plane circular, plane annular ($a_i = a_o/2$) spherical ($A = 0.53$) and spherical annular ($A = 0.53$, $a_i = a_o/2$) transducer; $a_o = 7.5$ mm, frequency 2 MHz, $n_c = 2$ - modulated Gaussian pulse. (page seventeen) |

APPENDIX A

The following technical paper authored by the inventor is incorporated as part of the Detailed Description of the present specification:

Radiation Field Calculations of Pulsed Ultrasonic Transducers

Plane Circular, Square, Annular and Spherical Transducers

A. Weyns *

* Author's address: Med. M.S.E.E. Arthur Weyns Siemens AG, Medical Engineering Group Postfach 32 60 D-8520 Erlangen W. Germany (to be submitted for publication in "Ultrasonics")

I. Introduction

The image quality of medical diagnostic ultrasonic equipment strongly depends on the characteristics of the nearfield as well as the farfield region of the transducer used. So for quality judgement and optimalisation of the ultrasonic radiator, a detailed picture of the whole acoustic field in front of the radiator, showing the nearfield interferences, the focussing effect and angle of aperture, is necessary. Beam patterns of harmonic-excited radiators have been published by Zemanek [1], Lockwood and Willette [2]. In most diagnostic ultrasonic equipment, however, the pulse-echo method is applied. Transient analysis of acoustic fields have been reported, by many investigators [4–15], but they have made their calculation only for so few points of the near- and farfield, that a detailed beam pattern cannot be reconstructed.

It is the purpose of this paper to report the results of numerical calculations describing the beam pattern of pulse-excited transducers, using a method of presentation similar to that of Zemanek [1]. The effects on the radiation field caused by transducer shape and size, frequency, pulse duration and number of cycles within the pulse, will be studied.

The sonic waves are assumed to propagate themselves in a homogeneous, lossless water medium of infinite extent. Only a thickness mode vibration with all parts of the radiator vibrating at the same amplitude is considered. The radiator is regarded as a rigid piston, surrounded by an infinite baffle. For plane radiators, FIG. 1 shows the coordinates of the system used. The position of the observation point P is a function of r, i.e. the radial distance from the center of the transducer, and of $\alpha$, the angle between the piston axis and the radial vector.

In order to calculate the sonic field of pulse-excited radiators, the real pulse is replaced by a sine-modulated Gaussian pulse which is a good approximation of the pulse used in medical diagnostic equipment as can be seen in FIG. 2. Using this approximation, the transducer motion is described by $$z(r', \tau) = z_o e^{-k^2\tau^2} \cdot e^{-j\omega_0\tau}, \qquad (1)$$

where k is a constant, which defines the width of the Gaussian envelope at a level of $-10$ dB below the peak.

$$\tau = t - r'/c. \qquad (2)$$

c wave velocity

Using $u(\tau) = \delta/\delta\tau$, the pressure can be evaluated numerically is a way similar to that of Zemanek [1] using the well-known general equation of the pressure given by Morse [3]. The following transducer shapes are studied: plane circular, plane square, plane annular, spherical and spherical annular.

II Plane Circular Transducer

According to the ultrasonic imaging system, especially to the brightness modulation, the maximum amplitude of the pressure wave in each point must be considered. Thus for each point of a 3360 point-, two-dimensional grid in the XZ-plane, the maximum amplitude of this pressure wave, $p_m = \max|p(t)|$ is determined. For the graph of the radiation field, the maximum $p_m$-value, $(p_m)_{max}$, of all points of the grid having the same Z-coordinate was ascertained and the $p_m$ values concerned were normalized in dB to this maximum value:

$$p_r(X_o, Z_o) = 20 \lg \left| \frac{p_m(X_o, Z_o)}{p_m(X, Z_o)} \right|_{max}. \qquad (3)$$

For the numerical integration, the surface of the transducer was divided into $(\lambda/4)^2$ elements. The results obtained in this way were equal in accuracy within 1% of results using elements of half the size.

According to Zemanek [1], the variables Z and X are dimensionless and defined as:

$$Z = z/(a^2/\lambda) \qquad (4)$$

$$X = x/(a^2/\lambda) \qquad (5)$$

with a radius of the transducer $\lambda$ wavelength of the modulation wave

First, the influence of the number of cycles within the $-10$ dB pulse width, $n_c$, is examined. FIG. 3 shows the sonic field of a continuously excited circular piston for $a/\lambda = 10$ as published by Zemanek [1]. In FIGS. 4, 5 and 6, $n_c$ is reduced to 24, 2 and 1 respectively. A comparison of these four normalized sonic fields proves: the farfield, i.e. the range beyond the focus, is independent of $n_c$. The influence of $n_c$ on the nearfield, however, is very significant. Compared to the harmonic wave propagation, for $n_c = 24$, only in the range $0 < Z < 0.5$, does the nearfield pattern show some simplification, i.e. the number of points in which interference maxima and minima occur diminishes and the side lobes are reduced in size and number. This simplification progresses slowly at first, reducing $n_c$ from 24 to 6, then becomes considerable from $n_c = 5$ up to $n_c = 1$. At $n_c = 1$, the minimum on the Z-axis, which exists at $Z = 0.55$ for $n_c = 2$ (FIG. 5), shifts to $Z = 0.65$ and is reduced to a value of $= 2.4$ dB. Therefore as shown in FIG. 6, no fine structure within the graph is recorded. In the focal range, a reduction of $n_c$ diminishes the focussing effect, i.e. the relative focal width $w_f$ (focal beam width divided by the radius a) and the normalized focal distance $d_f$ (normalization factor $a^2/\lambda$) increase. As for the simplification of the nearfield structure this reduction of the focussing effect essentially happens for $n_c \leqq 5$ as shown in FIG. 7. Thus, the transition from "continuous wave" to "pulse" beam pattern practically occurs in the range $0.5 \leqq n_c \leqq 5$. For $n_c = 0.5$, some focussing effect is still found due to the wave cycles within the Gaussian pulse having an amplitude more than 10 dB below the peak value. The results agree very well with the data published by Beaver [3]. Especially for his Type IV pulse, which also contains about two cycles within the —10 dB width of the half-sine envelope, the agreement is excellent. Also for the beam pattern, corresponding to the one-cycle Type II pulse with a square envelope in [3], the similarity is quite good.

Treating the influence of the transducer radius a and the frequency f, the same effects on the nearfield structure as those for harmonic wave excitation are found, i.e. a decrease of $a/\lambda$ causes a reduction of the nearfield complexity and a reduction of the side lobes. However, the smaller $n_c$ is, the smaller these effects become.

In the focal range, Table I proves that, for the same $n_c$-value, the normalized focal distance as well as the relative focal width are independent of the radiator size. Up to $n_c \geqq 6$, the same holds for a variation of the frequency as shown in Table II. This is understandable as up to $n_c = 6$, the beam pattern practically behaves in the same way as with harmonic excitation where the same effects are found. For smaller values of $n_c$, a reduction of the frequency causes a decrease of $d_f$ as well as an increase of $w_f$, both of about 5%. Thus the influence of the frequency of the normalized radiation field is less pronounced than that of $n_c$.

Finally, Table II proves that the $-10$ dB pulse width itself does not directly influence the acoustic field. For instance, a same $-10$ dB pulse width of 1 $\mu$s, corresponding to two cycles at 2 MHz and only one cycle at 1 MHz, results in a different nearfield structure and a different focal range.

As a consequence, for plane circular radiators, the number of cycles $n_c$ turns out to be a more important factor for the normalized radiation field than the modulation frequency and the radius a. Moreover, a comparison with the results of Beaver [4] proves that the form also of the envelope pulse does not have a great influence on the radiation field.

III Plane Square Transducer

In order to compare the beam patterns of square radiators with those of the circular transducers described above, the areas of both radiator types are taken to be equal. In analogy to the case of a circular piston, $d^2/\lambda$ (d is half the side of the square) was used as normalization factor. Further, for a square piston, it is important to note that there are two main intersections to be considered; one along a line of gravity and another along the diagonal.

Concerning the acoustical field in the plane along a line of gravity, FIGS. 8 and 9 show a simplification of the nearfield compared to that of the circular radiator, independent of $n_c$. This agrees with the on-axis intensity variations for a continuously vibrating square radiator as published by Marini and Rivenez [16]. On the other hand, the number and magnitude of the side lobes increase. The converse applies to the wave pattern in a plane along a diagonal: the nearfield is more complicated, whereas the number and magnitude of the side lobes decrease compared to the circular transducer as can be seen in FIGS. 8 and 9. Considering the sonic fields in the two main sections of the square, Table III shows that the focussing effect is more pronounced in the diagonal section. This is understandable in consequence of the greater possibility of interference in this plane.

In order to compare the normalized focal distance of circular to square transducers, it is more convenient to take the same normalization factor $a^2/\lambda$ in both cases. Here, a is the radius of a circular radiator having the same area as the square transducer with half the side d. The values within the brackets in Table III correspond to this normalization. They prove that the focal distance for a square piston is always larger than that of a circular piston, but the difference diminishes as $n_c$ decreases. A comparison of the relative focal width using the same reference value, i.e. a instead of d, demonstrates that the focal width for the square transducer is also larger, but the dependence of the focal width on $n_c$ is less pronounced than with the circular radiator.

Concerning the dependence of the wave patterns on the number of cycles $n_c$, the same holds as with the circular transducer: a reduction of $n_c$ causes a simplification of the nearfield structure and a decrease in the focussing effect. The latter especially occurs for $n_c \leqq 5$ as shown in FIG. 10.

As for the circular transducer, a decrease of $d/\lambda$ causes a reduction of the nearfield complexity and a reduction of the side lobes. Dealing with the focal range, Table IV proves that the normalized focal distance as well as the relative focal width are independent of the radiator size. Up to $n_c \geqq 8$, the same holds for a variation of the frequency as shown in Table V. For smaller values of $n_c$, a reduction of the frequency causes a decrease of $d_f$ as well as an increase of $w_f$. But, contrarily to the circular transducer, this increase of $w_f$ is less pronounced: about 1% instead of 5%.

Table V also proves that, as is the case for circular radiators as well, the $-10$ dB pulse width itself does not directly influence the acoustic field.

In consequence, the number of cycles, $n_c$, turns out to be the most important parameter for the normalized radiation field of the plane square transducer as well.

IV Annular Transducer

To facilitate the comparison with results given in paragraph II, the outer radius of the annular radiator ($a_o$) is assumed to be equal to the radius a of the plane, circular, disk-shaped transducer already examined.

The following influences are studied: shape of ring, $n_c$ and position of the recess in the transducer.

The dependence of beam pattern on the ring shape is examined by comparing the disk to the annular form and by changing the inner radius on the ring ($a_i$). The wave pattern of annular transducers having an inner radius equal to half the outer radius for "continuous" and "pulse" excitation accordingly can be seen. in FIGS. 11 and 12. A comparison of these figures with FIGS. 4 or 5 respectively proves that an annular shape causes the following effects:

1. Improvement of the focussing effect i.e. reduction of focal beam width and focal distance
2. Considerable increase of the side lobes in size
3. Increase of the interference structure within the nearfield.

The greater the inner radius of the ring, $a_i$, is, the more pronounced are these effects. FIGS. 13 and 14 prove that only from $a_i \geq 0.25\ a_o$ on, does the influence of the ring shape on the focussing effect become noticable. A comparison of both figures demonstrates a similar dependence of $d_f$ and $w_f$ on $a_i$ for "continuous" as well as for "pulse" excitation. For "continuous" excitation, increasing $a_i$ from zero to $0.5\ a_o$, $w_f$ and $d_f$ decrease slowly at first, up to $a_i=0.25\ a_o$ for about 15% for the former and 5% for the latter respectively, then rapidly, at $a_i=0.5\ a_o$ approx. 50% or 30% as before. As follows from these percentages, the relative reduction of $w_f$ is always more than that of $d_f$. For a "pulse" excitation with $n_c=2$ the decrease of $w_f$ is less pronounced, approx. 40% at $a_i=0.5\ a_o$, whereas the reduction of $d_f$ (35%) is nearly the same. Much more dependent on the number of cycles, $n_c$, are the side lobes and the fine structure within the nearfield. A comparison of FIGS. 11 and 12 proves the considerable decrease of the $-10$ dB and $-20$ dB side lobes in size, as well as the simplification of the nearfield at the transition from "continuous" to "pulse" excitation. Nevertheless, even with these small values of $n_c$, the dimensions of the side lobes and the complexity of the nearfield structure are more pronounced for a ring- than for a disk-shaped radiator.

Another interesting aspect is the position of the recess in the transducer. Instead of an annular radiator, which is a circular transducer with a hole in the center, a circular piston with a wedge-shaped recess of equal area at its top is considered. From FIG. 15 and Table VI, it is clear that this recess at the top of the radiator has less influence on the radiation field than a centrally positioned recess does. Compared to the wave pattern of the disk-shaped transducer (FIG. 5), the change of the nearfield structure and the focal range depends on the area and depth of the wedge-shaped recess. Table VI shows: a wedge-shaped recess influences $w_f$ always less than an annular shape. On the other hand, the reduction in $d_f$ strongly depends on the depth and the area of the wedge extending from approx. 0% for a depth of $a_o/5$ and an area of 1/25 of a disk-shaped radiator up to 34% for a depth of $a_o/2$ and an area of $\frac{1}{4}$ of a disk. As indicated, the decrease in $d_f$ is here also less than with a ring. Finally, an application of a recess at the border results in an asymmetrical sonic field and a shifting of the acoustical axis to the opposite side of the transducer.

Because of the undesired, considerable reduction of the directivity accompanied by the desired increase of the focussing effect, a plane annular transducer as well as a plane annular illumination of arrays is not the best way of reducing the focal width and the focal distance.

V Spherical Transducer

For the spherical radiators considered, the secondary diffraction, i.e. the fact that waves radiated from any part of the surface are diffracted by other parts of this surface, will be neglected because the surface S is taken to be much larger than the wavelength. Here, the coordinate system of O'Neil is used [17]. For possibility of comparison with previous acoustic fields, the same transducer radius a and the same normalization factor $a^2/\lambda$, are assumed.

Concerning the influence of the normalized radius of curvature A, FIGS. 16 and 17 illustrate the dependence of $w_f$ or $d_f$ respectively on A, as results from numerical calculations. The form of the graphs for $w_f$ and $d_f$ proves that the smaller A is, the greater the reduction rate of both parameters will be; this means: a decrease of the radius of curvature causes an increase of the focussing effect which is the more important the smaller the radius of curvature. For instance as FIG. 17 illustrates, reducing A from $\infty$ to 2.0 results in a decrease of $d_f$ of approx. 30%, whereas a supplementary reduction to 1.0 or 0.5 augments this percentage to 48% or 63% respectively. FIG. 16 shows that the same holds for $w_f$ but here, the corresponding reductions are about 2% higher. According to the slope of the graphs in FIG. 16, the increase of the focussing effect occurs for $A \leq 0.5$ especially. But even for a relatively high value of A, 1.0 or 2.0, the increase of the focussing effect is still considerable: approx. 50% or approx. 30% respectively. Another interesting feature attained by a geometrically focussed radiator: as contrasted with a plane-shaped piston, an increase in the focussing effect by reduction of A causes the focus of the different pressure contours ($-3$ dB, $-6$ dB, $-10$ dB) to approximate each other. Thus for small values of A, the focal distances of $-3$ dB and $-10$ dB are about the same as shown in FIG. 21.

Furthermore, in FIGS. 16 and 17, a comparison with the values obtained by the Kossoff formula for curved radiators [20] is made. For $d_f$ as well as $w_f$, the values obtained by Kossoff are always larger than the numerically calculated values. Considering $d_f$, the deviation decreases for small and great A-values whereas for $w_f$, the difference diminishes only for a decreasing A. Dealing with the different pressure contours, Kossoff's approach results in the same $d_f$-value for all of them.

On the other hand, A does influence the angle of aperture of the beam pattern as well. As the $-3$ dB contours beyond the focal range are not always straight lines, as can be seen in FIGS. 19, 20 and 21, the angle of aperture is ascertained as the angle between the radiator axis and the straight line through the $-3$ dB focus and the point at which twice the focal width is attained. Thus the formula for $\theta$ is:

$$\theta = \arctan\,[w_f/(d_{2f} - d_f)] \qquad (6)$$

with $d_{2f}$, the normalized distance on the piston or Z-axis where twice the focal width is attained.

The influence of A on $\theta$ is shown in FIG. 18. Firstly, it is important to notice that the angle of aperture not only depends on A but also on the pressure contour considered, for instance $-3$ dB or $-10$ dB. However, the same holds for both contours: a reduction of A increases the angle of aperture especially from $A \leq 0.5$ on. The considerable increase of $\theta$ for the $-3$ dB pressure contour in this range is caused by the nonlinear beam pattern between the distances $d_f$ and $d_{2f}$. Thus for spherical radiators, the optimum value of A, combining a good focussing effect and a small angle of aperture lies within the range $0.4 \leq A \leq 0.6$.

FIG. 18 also shows the values of $\theta$ obtained with the Kossoff formula. Here, a difference must be made between the $-10$ dB and $-3$ dB contours. For $-10$ dB, Kossoff's approach results in smaller $\theta$ values. In the range $0.5 \leq A \leq 0.9$, for both methods of calculation, the same angle of aperture is found. Considering $-3$ dB, Kossoff's formula delivers higher values especially for $0.3 \leq A \leq 0.8$, and about the same values for $A > 1.5$.

Looking at FIGS. 19, 20, 21 and 22, two surprising characteristics of sonic fields of spherical radiators come to the fore: firstly, the increase of the beam width beyond the focus is not a linear function of Z, as it is with plane transducers; secondly, the existence of interference minima beyond the focal range. As FIGS. 20, 21 and 22 illustrate the location of the zone of the nonlinear beam pattern as well as the position of the unusual interference phenomena depend on the value of A. When A has large values, these two characteristics occur for large values of Z. Thus, in the region of interest, these radiators have a linear beam pattern without the minimum on the Z-axis. A decrease of A causes a reduction in the size of this farfield interference zone as well as a decrease in the distance from the radiator at which it happens. The latter also holds for the range of nonlinearity.

Beam pattern measurements on strongly-focussed transducers prove this unusual behaviour. The interference structure beyond the focal range also exists for "continuous" excitation as shown in FIG. 23. Thus the existence of higher frequencies within the modulated Gaussian pulse, for which the nearfield structure extends over greater distances from the transducer, cannot be an explanation for these phenomena.

Finally, in opposition to the sonic fields of annular radiators, an increase in the focussing effect by reduction of A is not accompanied with a complication of the nearfield structure or an increase of the number and size of the side lobes.

VI Spherical Annular Transducer

A combination of both foregoing transducer shapes, i.e. a geometrical focussed ring, causes a further increase in the focussing effect as shown in FIG. 24. A comparison of the spherical with the plane ring proves that the increase of the focussing effect (i.e. decrease of $w_f$ and $d_f$) becomes the more important the smaller A is. Assuming $a_i=a_o/2$, the decrease of 35% for $d_f$ at $A=1.07$ rises to 65% at $A=0.32$. The same holds for the reduction of $w_f$ but now the percentages of decrease are about 5% greater than the corresponding values for $d_f$. Thus the spherical ring shape has a little more influence on $w_f$ than on $d_f$, which is important for ultrasonic imaging systems. Nevertheless, a comparison of the influence of the ring shape on plane transducers to that on spherical transducers, i.e. comparing FIG. 25 and 26 with FIG. 14, demonstrates that the ring structure does not increase the focussing effect for the spherical transducer as strongly as it does for the plane radiator. The smaller A, the more pronounced this effect is. For instance, at $A=0.53$ a decrease of $a_o/a_i=\surd$ to $a_o/a_i=2$ results in a reduction of $w_f$ by about 30% in opposition to 50% for the plane annular transducer (FIG. 25) and in a decrease of $d_f$ by approx. 15% as opposed to 35% (FIG. 26). For $A=2.0$, however, the same reduction in $a_o/a_i$ results in a decrease of $w_f$ by about 40% and a reduction in $d_f$ by approx. 25%. A much more important feature of the geometrical focussed ring is the fact that this radiator shape reduces the negative characteristics of the beam patterns of spherical as well as of annular transducers, which were inherent in an increase of the focussing effect. For instance, for the plane annular radiator a reduction of $w_f$ by more than 40% as compared to the plane circular, disk-shaped radiator requires an inner radius of more than one half the outer radius and results in a considerable increase of the side lobes. For spherical disk-shaped transducers, a reduction of $w_f$ by more than 65% as compared to the plane circular disk-shaped radiator requires a value of A smaller than 0.5 and results in an important increase of the angle of aperture. $\theta$, together with an approaching of the farfield interference structure. In the case of spherical ring-shaped radiators, a decrease of $\theta$ can be obtained by increasing the inner radius as shown in Table VII and in FIG. 27. As the sonic field of the spherical ring has larger side lobes than that of the spherical disk-shaped radius has, there exists an optimum for the magnitude of the inner radius which depends on the characteristics of the imaging system. Furthermore, FIG. 27 also demonstrates the considerable reduction of the side lobes using a spherical annular transducer by comparison to those of a plane ring shape.

In consequence, the use of an annular radiator can best be combined with a geometrically focussed shape. For spherical transducers, the combination with a ring shape should be used if $w_f$- or $d_f$-values less than 0.20 or 0.37 respectively are demanded.

VII Conclusion

The sonic field of pulse-excited radiators strongly depends on the number of cycles within the pulse. The transition from "continuous" to "pulse" excitation occurs from $n_c=6$ on and shows the following features:

Reduction of the nearfield structure
Reduction of the side lobes in size and number
Reduction of the focussing effect.

The transducer shape itself also has important consequences on the beam pattern (FIG. 27). Certain of the aforementioned figures of the technical paper have now been published in my paper identified as follows:

"Radiation field calculations of pulsed ultrasonic transducers Part 1: planar circular, square and annular transducers", published in *Ultrasonics,* July 1980, pages 183 through 188, "Radiation field calculations of pulsed ultrasonic transducers Part 2: spherical disc- and ring-shaped transducers", *Ultrasonics,* September 1980, pages 219 through 223.

The figures of the foregoing technical paper which are identically found in the above referenced published paper, are identified in the following Table B:

TABLE B

| Figure Designation of the Technical Paper Quoted Herein, (as Submitted for Publication) | Corresponding Figure Designation and Location in the Published Paper Identified Above |
|---|---|
| Twelve | Ninth figure, Part 1, page 187 |
| Fourteen | Tenth figure, Part 1, Page 187 |
| Sixteen and Seventeenth | Second figure, views a and b, Part 2, page 220 |
| Eighteen | Third figure, Part 2, page 221 |
| Twenty-one | Sixth figure, Part 2, page 221 |
| Twenty-five | Ninth figure, Part 2, page 222 |
| Twenty-six | Tenth figure, Part 2, page 222 |
| Twenty-seven | Eleventh figure, Part 2, page 223 |

Supplemental Discussion

In order to assist in a correlation of the incorporated paper (partially found in the foregoing Appendix A) with the notation and description of the application FIGS. 1–3*e*, the following further discussion is presented.

The notation of the incorporated paper and the description of FIGS. 1–3*e* are correlated as follows:

| Terminology in Specification | Symbol | Corresponding Parameter of Incorporated Paper |
|---|---|---|
| Standardized Radius | $R_N$ | A |
| Focal Distance | $F_A$ | $d_f a_o^2 / \lambda$ |
| Focal Beam Width | $F_B$ | $W_f a_o$ |

Detailed Description

Thus the term $d_f$ in the incorporated paper corresponds to the normalized focal distance as given in equation (8) of the description of application FIGS. 1–3*e*.

The term $W_f$ in the incorporated paper corresponds to the relative focal beam width $F_B/a_o$.

For purposes of the present application the term "focus" may be defined as the range (distance from the transducer) at which the corresponding contours under consideration (e.g. the −3 dB pressure contours, Figure twenty-seven of the incorporated paper) are closest together.

The following values correspond to the example given in FIGS. 3*a*–3*e* of the application drawings:

| Numerical Values in Application FIGS. 3a-3e | |
|---|---|
| $a_o/a_i = 3$ | $a_o = 20$ mm |
| $W_f = .10$ | $a_i = 6.5$ mm |
| $d_f = .22$ | $\lambda = .43$ mm |
| R = 242 mm | $n_c = 2$ |
| $R_N = A = .26$ | frequency = 3.5 MHz |
| $F_A = 205$ mm | $F_B = 2.0$ mm |
| −3dB Angle of Aperture, $\theta$ (−3dB) = 57° | |
| −10dB Angle of Aperture, $\theta$ (−10dB) = 72° | |

From the work reported herein, the preferred values for the case of a geometrically curved apertured transducer such as shown in application FIGS. 1, 3 and 4, are as follows (referring to values with respect to −3 dB pressure contours as explained with respect to equation three of the incorporated paper):

(i) relative focal beam width $W_f$ less than 0.20

(ii) normalized focal distance $d_f$ less than 0.37

(iii) standardized radius $R_N$ or A less than 0.6

(iv) ratio of outer radius to inner radius $a_o/a_i$ in the range from 2 to 6

The optimum values for item (iv) above are as follows: The ratio $a_o/a_i$ is optimally in the range from 2 to 4, the smaller the value $n_c$ the smaller the optimum value of $a_o/a_i$, so that the following approximate optimum values hold for $n_c=2$, $a_o/a_i=3$; for $n_c=1$, $a_o/a_i=2.5$; for $n_c=4$, $a_o/a_i=3.5$. The exact optimum values depend on what percentage of side lobes is allowed in the imaging system of the equipment; the higher such percentage, the smaller the optimum value of $a_o/a_i$ for a given value of $n_c$. For the −40 dB contours, decreasing $a_o/a_i$ results in an increase of $W_f$ and $d_f$, so for good focusing, a value for $a_o/a_i$ which is smaller than two is not advisable.

With respect to the example of FIGS. 3*a*–3*e*, the parameters given are obtained by the conditions:

(i) $F_B=W_f a_o=2$ mm (ii) $F_A=d_f a_o^2/\lambda$ greater than 20 cm (for the case where a water coupling path is used)

(iii) $n_c=2$, a frequency less than 4 MHz (iv) −3 dB angle of aperture $\theta$ (−3 dB) and side lobes to be as small as possible The relationships $d_f=F(A, a_o/a_i)$ and $W_f=G(A, a_o/a_i)$ are of the type shown in Figures twenty-six and twenty-five of the incorporated paper. With these relationships established, a set of values of A ($R_N$), $a_o/a_i$ and frequency which belong together are determined for fulfilling the above conditions. A compromise between decrease of angle of aperture $\theta$ (see Table A) and increase of side lobes is effected, by decreasing $a_o/a_i$, especially to a value less than three but not less than two, such a selection of $a_o/a_i$ resulting in an optimum transducer configuration.

It will be apparent that many modifications and variations may be effected without departing from the scope of the novel concepts and teachings of the present invention.

I claim as my invention:

1. A method for the manufacture of ultrasonic transducers with at least one ultrasonic transducer whose active surface exhibits recesses and whose sound radiation field is to be prescribable in terms of focal distance, focal width and angle of aperture in connection with the focus and ultrasonic frequency, characterized by the following steps:

(a) for the two focal magnitudes of focal width ($F_B$) and focal distance ($F_A$) to be prescribed, there is first determined for one of the two focal magnitudes (for example, $F_B$) either its outer dimension ($2a_O$) as a function of the radius of curvature (R) of the ultrasonic transducer (1; 5) or its radius of curvature (R) as a function of the outer dimension ($2a_O$);

(b) given the outer dimension determined in that manner or the radius of curvature determined in that manner, the magnitude radius of curvature or, respectively, outer dimension not yet determined for the other of the two prescribable focal magnitudes (for example, $F_A$) is determined.

(c) finally, the maximum value of the angle of aperture of the sound radiation field behind the focus deriving for the outer dimensiom ($2a_O$) and radius of curvature (R) according to steps (a) and (b) is limited by means of the introduction of a recess (2: 8, 9) in the active surface of the ultrasonic transducer (1; 5) of such size ($2a_i$) that the optimum relationship between the angle of aperture and side lobes of the sound radiation field ensue.

2. A method according to claim 1, characterized in that, when one of the two focal magnitudes is given, the outer dimension ($2a_O$) of the ultrasonic transducer (1; 5) is determined as a function of a standardized radius of curvature $R_N$ ($R_N=R/[a_O^2/\lambda]$ standardized to the relationship $a_O^2/\lambda$, with $a_O$ as half the outer dimension of the ultrasonic transducer and $\lambda$ as the ultrasonic wavelength.

3. A method according to claim 2, characterized in that, given an outer dimension ($2a_O$) determined in such manner as a function of $R_N$, the standardized radius of curvature ($R_N$) as well as the actual value $2a_O$ and from these, finally, the actual radius of curvature (R) is determined for the other prescribed focal magnitude.

4. An ultrasonic transducer manufactured according to the method of claim 1, characterized in that a transducer part (1; 5) determined according to steps (a) and (b) of claim 1 as to outer dimension ($2a_O$) and radius of curvature (R) of the focusing has recess means (2; 8; 9) for effective removal of a portion of the transducer part.

5. An ultrasonic transducer manufactured according to the method of claim 1, characterized in that a transducer part (1; 5) determined according to steps (a) and (b) of claim 1 as to outer dimension ($2a_O$) and radius of curvature (R) is electrically subdivided into individual radiation surfaces (6) and is effectively provided with a recess by means of the electrical disconnection of individual surface parts (8) in the active surface.

6. An ultrasonic transducer according to claim 4 with said recess means being provided by a mechanical removal (2 or 9) of a portion of the transducer part.

7. An ultrasonic transducer according to claim 4, characterized in that a transducer (1) provided with a mechanical recess (2) is designed as a ring transducer, preferably in circular or oval form.

8. An ultrasonic transducer according to claim 7 characterized in that the transducer (1) is in the form of a ring of unitary construction (FIG. 1).

9. An ultrasonic transducer according to claim 7 characterized in that the transducer (1) is comprised of a matrix of individual oscillator elements formed into a ring (FIG. 2).

10. An ultrasonic transducer according to claim 5, characterized in that an ultrasonic transducer (5) (FIG. 4) is constructed of individual elements (6) which can be switched off in a group (8) of individual segments associated with a further group (7) of individual segments, whereby the blanked-out group (8) determines the dimensions of the recess in the surface shape.

11. An ultrasonic transducer according to claim 10, characterized in that transducer (5) additionally exhibits mechanically recesses (9) in the active surface.

12. An ultrasonic transducer according to claim 4, characterized in that, for determining the radius of curvature (R) of the focusing according to step (b) of claim 1, the ultrasonic transducer has a recess and is mechanically bent with the desired radius of curvature of the focusing (FIG. 1).

13. An ultrasonic transducer according to claim 4, characterized in that, for determining the radius of curvature (R) of the focusing according to step (b) of claim 1, the ultrasonic transducer is of planar form and is focused with the radius of curvature purely electronically (FIG. 2).

14. An ultrasonic transducer according to claim 4, characterized in that, for determining the radius of curvature (R) of the focusing according to step (b) of claim 1, the ultrasonic transducer has a combination of mechanical curvature and electronic focusing (for example, FIG. 4).

15. An ultrasonic transducer according to claim 4, characterized in that an ultrasonic transducer with said recess means in the active surface and having a focal width $F_B = f(R, a_O)$ and a focal distance $F_A = g(R, a_O)$ is dimensioned as follows:

(a) the outer dimension amounts to $$a_O = F_1(R, F_B)$$

(b) the radius of curvature given this outer dimension amounts to $$R = G_1(F_A, F_1(R, F_B))$$

(c) given these values, the recess means has an inner dimension of such size $2a_i$ at which the relationship between the angle of aperture and side lobes of the sound radiation field is optimum.

16. An ultrasonic transducer system comprising ultrasonic transducer means for pulse excitation having an active surface with a lateral extent $2a_o$ with respect to a lateral axis normal to a propagation axis thereof and with a geometric curvature along said lateral axis exhibiting substantially a radius of curvature R, said ultrasonic transducer means having an effective recess along the lateral axis thereof with a lateral dimension $2a_i$ such that the ratio $a_o/a_i$ is substantially a measure of the relative lateral extent of the operating portion of said active surface along said lateral axis at each side of said propagation axis, said ultrasonic transducer means being operated with pulses of substantially an ultrasonic wavelength $\lambda$ and exhibiting substantially a focal distance $F_A$ along the propagation axis and substantially a three decibel focal beam width $F_B$ with respect to the lateral axis such that $F_A/a_o^2/\lambda$ is less than about 0.37 and $F_B/a_o$ is less than about 0.20, and such as to exhibit a standardized radius of curvature $R_N$ defined as to the ratio of radius of curvature R to the quantity $a_o^2/\lambda$, said standardized radius of curvature $R_N$ being of a value less than about six-tenths, and $a_o/a_i$ being of a value in the range from about two to about six.

17. An ultrasonic transducer system according to claim 16, characterized in that the ultrasonic transducer means has an effective recess with lateral dimensions such that the ratio $a_o/a_i$ is in a range between about two and about four.

18. An ultrasonic transducer system according to claim 17 with the exact value of the ratio $a_o/a_i$ being such as to substantially minimize the side lobes in the radiated ultrasonic field.

* * * * *